Feb. 17, 1931.  H. S. WILSON  1,792,521

MOVABLE DISPLAY APPARATUS

Filed May 31, 1929

Inventor:
Horace S. Wilson
By Cromwell Leistverwonder
Attys.

Patented Feb. 17, 1931

1,792,521

UNITED STATES PATENT OFFICE

HORACE S. WILSON, OF CHICAGO, ILLINOIS

MOVABLE DISPLAY APPARATUS

Application filed May 31, 1929. Serial No. 367,230.

This invention relates to advertising or display apparatus of a sort whereby a wide variety of movements and displays may be presented by appropriate variation of the display features and the motion control elements.

A general object of the invention is the provision of a movable display apparatus susceptible of embodiment in divers forms such as to present a great variety of displays and movements, and yet of very simple and inexpensive construction.

Another object is the provision of such an apparatus which may be packed and shipped, in knocked-down condition, in a very small compass, and may be assembled with certainty and facility.

Another object is the provision of such an apparatus which will give a suitably selected irregular or eccentric movement of display parts, and yet in which the actuating and movement control features are very simple but very certain in operation.

Other and further objects of the invention will be indicated or pointed out hereinafter, or will be apparent on an understanding or use of the invention.

For the purpose of aiding in the disclosure of the invention, I show in the accompanying drawing forming part of this specification, one embodiment of the same, but it is to be understood that this is presented merely by way of example, and is not to be construed in any fashion such as to limit the claims short of the true and most comprehensive scope of the invention in the art.

Figure 1:
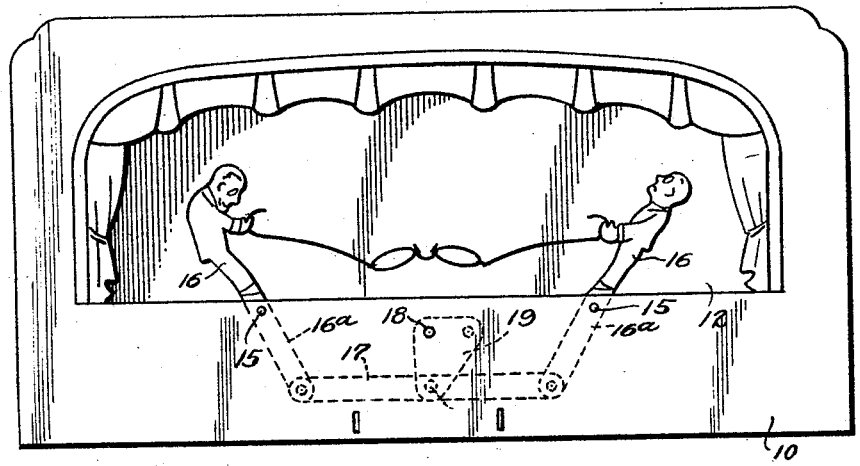
Figure 2:
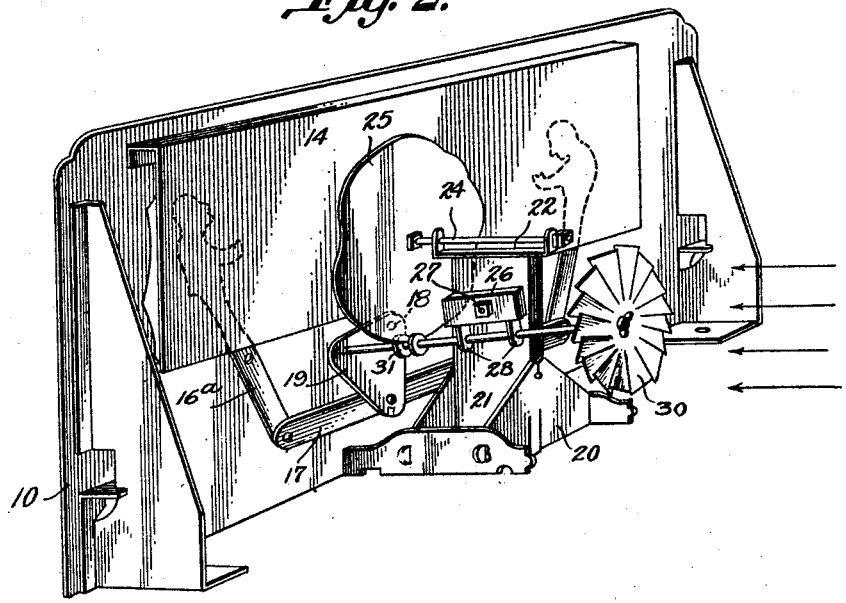

In said drawing,

Fig. 1 is a front elevational view of an advertising display embodying the invention; and Fig. 2 is a rear view of the same in perspective.

Movable advertising displays, as for window or counter use in stores, have pronounced advantage in attracting the eye. Due to the transitory nature of advertising displays, however, the question of the cost is of very great importance, and there has been a very pronounced need for movable displays which can be produced economically, yet which at the same time will be simple in construction and require very small space, particularly in depth. The present invention provides a construction whereby great variety of movements may be obtained with apparatus of very simple and economical construction, and which may be assembled readily by an inexperienced user, such as a merchant to whom the display may be furnished by the manufacturer or distributor of nationally advertised or distributed commodities.

Described generally, the invention contemplates the provision of a suitable support, in conjunction with which movable display members are arranged for display, and actuating means for same whereby they may be given certain movements appropriate to the commodity and the advertisemental idea which the display is intended to impart. This actuating mechanism comprises a pivotally mounted drive shaft, which is suitably actuated, as by means of a wind wheel driven by a blast of air from an ordinary electric fan, and which drive shaft, by suitable connections or linkages, is adapted to impart irregular, oscillatory or reciprocatory motion to the display members. This action is obtained by the moving of the drive shaft on its pivot, whereby its angularity is changed, said pivotal movement of the shaft being induced by its cooperation with an eccentric disk or camming device, which is rotated by the shaft, and which controls in a cyclic fashion the pivotal movement of the shaft and the resulting movement of the linkages through which motion is transmitted to the display members.

A more detailed understanding of the invention may be had by reference to the example shown in the drawing. It will be understood that in the form here shown, the reference numeral 10 designates a display sheet which may be supported upright by suitable foldable braces or brackets 11, disposed at its rear. This sheet affords a display aperture 12, and behind this depends a screen 14, which is also secured to the display sheet. Pivoted on the display sheet at 15, and extending part way across the view aperture, are movable display members 16, constituting arms of levers whose opposite arms 16a are concealed behind the display sheet and connected to a transverse link 17. Pivoted at 18 on the display sheet or support, and connected pivotally at 18a with the link 17, is a bell crank member 19. Behind the display sheet is disposed a frame 20 which may be of the construction described in detail and claimed in my co-pending application Serial No. 367,229, filed concurrently herewith, which frame is connected to the display sheet by tabs 21, whereby those parts are held in the desired relationship. This frame supports in upright position a strip 21 which, at its top, carries a bearing yoke member 22, having upturned ends in which is journaled a cam shaft 24. To one end of this cam shaft is secured the rotatable cam or eccentric disk 25. A block 26 is pivoted on the side of the strip 21, as by a bolt 27, so that it may oscillate in a vertical plane parallel to the face of the strip, and this block carries depending lugs or ears 28 in which is journaled the actuating shaft 29. At its rear end this shaft has a driving member, such as a wind wheel 30, demountably connected thereto, and at the other end it is journaled in the bell crank member 19, its point of connection with said member being at angles with both the pivots 18 and 18a. A small guide sheave 31 is affixed to the shaft 29 in position to bear on the rim of the eccentric disk 25.

When the wind wheel 30 is driven by a blast of air directed against it from the rear, the drive shaft 29 is rotated to drive the sheave 31. The sheave is maintained in contact with the margin of the eccentric disk 25 by the weight of the wind wheel, which tends to rotate the block 26 on its pivot. As the sheave 31 rotates, it rotates the eccentric disk 25 by virtue of their frictional driving engagement. As the disk 25 rotates, due to its eccentric contour, it varies the inclination of the drive shaft 29, which variation is accommodated by the pivotal mounting of the block 26. This raises and lowers the forward end of the drive shaft in accordance with the variations in the contour of the disk 25, and by virtue of the connection of the bell crank member with the shaft, such angular movement of the shaft causes the bell crank member to swing on its pivot 18. This produces oscillatory movement of the pivot 18a, and consequently a reciprocatory movement of the link 17, which movement of the link swings the levers 15 and causes the display members 16 to take a swaying or oscillatory movement. This movement is controlled by the contour of the disk 25 and, depending on said contour, may be irregular, regular or jerky, as desired. Thus, a great variety of motion effects may be obtained. In the example illustrated, the display members will be given movements whereby they appear to be tugging on the pair of spectacles whereby they are connected. It is obvious that the movement of these display members is not dependent on this last mentioned interconnection, however.

The apparatus may be packed in a very small depth, as the braces 11 may be folded down flat against the sheet, the strip 21 detached and the frame 20 folded down flat, as described in the copending application referred to, and the wind wheel 30 and the disk 25 detached from their shafts and laid flat, together with the strip 21, so that the entire apparatus may be packed in a very shallow carton. It will be apparent that the assembly of the device for use is very easy, the only driving connection which it is necessary to make being the insertion of the front end of the drive shaft into its hole in the bell crank member 19.

What I claim is:

1. In moving display apparatus, in combination, a movable display member, a pivotally mounted rotatable shaft operably connected with said display member, means for rotating said shaft, and a cam member rotatable by said shaft and cooperating therewith to induce movement of the shaft on its pivot.

2. In moving display apparatus, in combination, a movable display member, a driving shaft having operative connection with the display member, said shaft mounted for pivotal movement, and an actuating member mounted on the shaft at a distance from the pivot of the same and effective to control pivotal movement of the shaft by gravity.

3. In moving display apparatus, in combination, an actuating shaft, said actuating shaft having a pivotal mounting, a rotary member having frictional driving engagement with said shaft, and an actuating member connected with the shaft and tending by its weight to hold the same in frictional driving engagement with said rotary member.

4. In moving display apparatus, a combination as specified in claim 3 and including a movable display member operably connected with the actuating shaft.

5. In moving display apparatus, a combination as specified in claim 1 and wherein said cam member is of eccentric contour.

6. In moving display apparatus, a combination as specified in claim 1 and including a lever connection between the shaft and display member whereby oscillatory movement of the shaft induces oscillatory movement of the display member.

7. In moving display apparatus, in combination, an oscillable display member, an oscillable shaft operably connected therewith, means for rotating the shaft, and means driven by said shaft for effecting oscillation thereof.

8. In moving display apparatus, in combination, a rotatable shaft mounted for oscillatory movement, a movable display member operably connected to said shaft, a support to which said display member is pivoted, a wind wheel mounted on the shaft and operable by a blast of air to rotate the same, and means operable by rotation of the shaft to effect oscillation thereof.

9. In movable display apparatus, in combination, a support, a movable display member pivoted thereon, a pivotally mounted shaft operably connected with the display member, and a wind wheel mounted on the shaft and operable by a blast of air to rotate the same.

In testimony whereof I have hereunto subscribed my name.

HORACE S. WILSON.